(12) United States Patent
Logdberg

(10) Patent No.: US 7,565,233 B2
(45) Date of Patent: Jul. 21, 2009

(54) METHOD AND ARRANGEMENT FOR CONTROLLING AIR RESISTANCE

(75) Inventor: Ola Logdberg, Stockholm (SE)

(73) Assignee: Scania CV AB (publ) (SE)

( * ) Notice: Subject to any disclaimer, the term of this patent is extended or adjusted under 35 U.S.C. 154(b) by 404 days.

(21) Appl. No.: 10/556,135

(22) PCT Filed: Apr. 22, 2004

(86) PCT No.: PCT/SE2004/000609

§ 371 (c)(1),
(2), (4) Date: Nov. 9, 2005

(87) PCT Pub. No.: WO2004/098982

PCT Pub. Date: Nov. 18, 2004

(65) Prior Publication Data

US 2006/0247839 A1 Nov. 2, 2006

(30) Foreign Application Priority Data

May 9, 2003 (SE) .................................. 0301352

(51) Int. Cl.
*G06F 7/70* (2006.01)
(52) U.S. Cl. .................................. 701/70; 296/180.1
(58) Field of Classification Search .................. None
See application file for complete search history.

(56) References Cited

U.S. PATENT DOCUMENTS

| 4,601,508 | A | 7/1986 | Kerian | 296/1 S |
|---|---|---|---|---|
| 5,407,245 | A | 4/1995 | Geropp | 296/180.1 |
| 6,249,724 | B1* | 6/2001 | McCrary | 701/24 |
| 6,742,616 | B2* | 6/2004 | Leban | 180/116 |
| 6,846,035 | B2* | 1/2005 | Wong et al. | 296/180.1 |
| 6,886,882 | B2* | 5/2005 | Farlow et al. | 296/180.4 |
| 2004/0119632 | A1* | 6/2004 | Winner et al. | 342/70 |
| 2004/0193372 | A1* | 9/2004 | MacNeille et al. | 701/213 |
| 2007/0158502 | A1* | 7/2007 | Bonutti | 244/130 |

FOREIGN PATENT DOCUMENTS

| DE | 36 19 959 A1 | 12/1987 |
|---|---|---|
| DE | 36 20 843 A1 | 12/1987 |
| GB | 2 068 851 A | 8/1981 |

OTHER PUBLICATIONS

International Search Report PCT/SE2004/000609 dated Jun. 1, 2004.

* cited by examiner

*Primary Examiner*—Khoi Tran
*Assistant Examiner*—Nicholas Kiswanto
(74) *Attorney, Agent, or Firm*—Ostrolenk, Faber, Gerb & Soffen, LLP

(57) ABSTRACT

A method for regulating during driving the air resistance to a leading and at least one following vehicle, whereby the distance of the leading vehicle from the following vehicle is detected and the magnitude of a wake formed behind the leading vehicle is regulated according to the detected distance in order to optimize the overall air resistance to the leading and the following vehicle. Also a device and a computer program and a computer program product for implementing the method.

9 Claims, 2 Drawing Sheets

METHOD AND ARRANGEMENT FOR CONTROLLING AIR RESISTANCE

CROSS REFERENCE TO RELATED APPLICATION

The present application is a 35 U.S.C. §§ 371 national phase conversion of PCT/SE2004/000609, filed 22 Apr. 2004, which claims priority of Swedish Application No. 0301352-1, filed May 9, 2003. The PCT International Application was published in the English language.

TECHNICAL FIELD OF THE INVENTION

The invention relates to a method and a device for control of air resistance to vehicles. The invention also relates to a computer program for implementing the method and a computer program product comprising the computer program.

BACKGROUND AND STATE OF THE ART

The air resistance to a vehicle leads to higher fuel consumption. There are therefore obvious advantages, both economic and environmental, in reducing the air resistance as much as possible.

One factor affecting the air resistance to a vehicle is the wake which follows a moving vehicle. The wake behind the vehicle is a region of lower than ambient air pressure, resulting in a braking effect on the vehicle. Various solutions have been put forward for reducing the magnitude of the wake and hence its influence on the air resistance to the vehicle.

One solution is to use a so-called "boat tail", i.e. a lengthening of the vehicle with a slope inwards relative to the vehicle's longitudinal axis. The air is thus caused to flow better round the vehicle without separation, thereby reducing the magnitude of the wake. However, that solution is not used very much, because it means sacrificing too much cargo space, since vehicle maximum lengths are limited by laws and regulations.

Another solution which has the same effect as the above solution is to make the rear of the vehicle rounded and use so-called active boundary layer control. This entails air being sucked or blown through a narrow gap at the rear of the vehicle so as to cause air streaming past the vehicle to flow round the vehicle without separation. This is a known technique from aircraft.

In convoy driving, however, the wake behind a vehicle may be an advantage in that the vehicle behind derives benefit from the lower air pressure in the wake of the vehicle ahead and is thereby subject to lower air resistance. The various solutions for reducing the magnitude of the wake may thus entail a disadvantage in convoy driving, by depriving the following vehicles in the convoy of the air resistance reducing effect of the wake.

SUMMARY OF THE INVENTION

One object of the present invention is to provide regulating of air resistance to vehicles whereby the air resistance is optimised both in single driving, i.e. with a single vehicle, and in convoy driving, i.e. with two or more vehicles following one another.

This is achieved by a method for regulating during driving the air resistance to a leading vehicle and at least one vehicle following it whereby the distance between the leading and following vehicles is detected and the magnitude of a wake formed behind the leading vehicle is regulated on the basis of the detected distance in order to optimise the overall air resistance to the leading and following vehicles. The result is a method which optimises the air resistance in various driving situations.

With advantage, the regulating of the magnitude of the wake behind the leading vehicle is switched off when the distance between the latter and the following vehicle decreases to below a predetermined value. This provides a simple and reliable indication of how best to regulate the air resistance.

The object is also achieved by a device for regulating during driving the air resistance to a leading vehicle and a following vehicle, which device comprises means for regulating the magnitude of a wake formed behind the leading vehicle and also comprises a distance sensor for measuring the distance between the leading and the following vehicle, and a control device for controlling the means for regulating the magnitude of the wake on the basis of the distance detected by the sensor, in order to optimise the overall air resistance to the leading and the following vehicle. This device can be used to optimise the air resistance in various driving situations.

The invention also relates to a computer program comprising computer-readable code means which, when run on a computer, causes a control device to implement the above method, and a computer program product comprising a support and said computer program, the computer program being recorded on the support. The result is a simple way to take care of regulating the air resistance without burdening the driver with extra tasks.

DESCRIPTION OF THE DRAWINGS

The invention is described below with reference to the attached drawings, in which.

DESCRIPTION OF EMBODIMENTS

Figure 1:
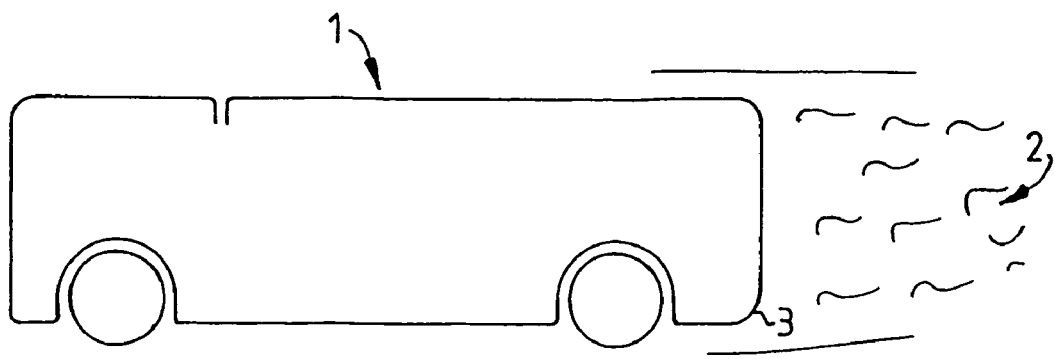
FIG. 1 depicts schematically a vehicle without active boundary layer control.
Figure 2:
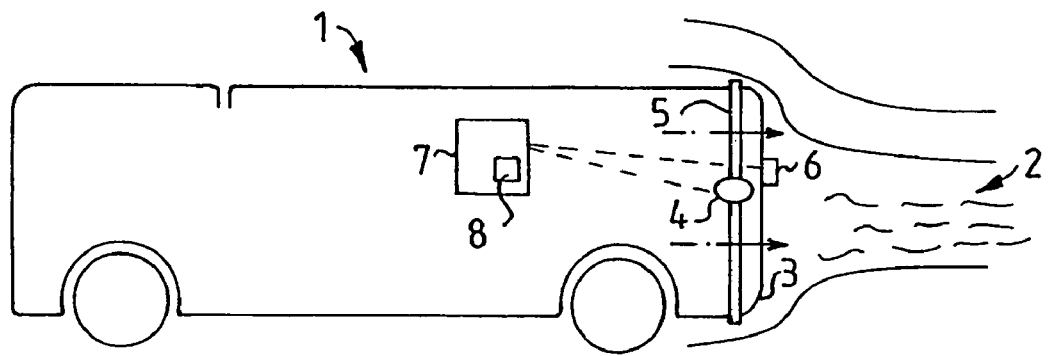
FIG. 2 depicts schematically a vehicle with active boundary layer control.

When a vehicle 1 is in motion, the air flow about the vehicle results in the formation of a wake 2 behind the vehicle 1. In the wake 2, a lower than ambient air pressure prevails, causing a braking effect on the vehicle 1. FIG. 1 and FIG. 2 depict schematically two different air flows about a vehicle 1. The lines outside the vehicle 1 at the rear edge 3 of the vehicle 1, and the lines behind the vehicle 1, represent the air flow at the rear edge 3 and in the wake 2.

Ways of reducing the magnitude of the wake 2, as illustrated in FIG. 2, include having the rear edge 3 of the vehicle 1 rounded and using so-called active boundary layer control. These measures reduce the magnitude of the wake, making it possible to lower the air resistance by about 10-20% and hence reduce fuel consumption. Active boundary layer control involves using, for example, a pump or a compressor 4 for sucking or blowing air (represented schematically in FIG. 2 by chain-dotted arrows) through a narrow gap 5 around the vehicle 1, just ahead of the radius at the vehicle's rear edge 3. The air streaming past the vehicle 1 is thus made to flow round the vehicle without separation, thereby reducing the magnitude of the wake 2.

Convoy driving of vehicles 1, e.g. trucks and buses, reduces the air resistance to the following vehicles in the convoy through their being able to derive benefit from the wake 2, with its lower air pressure, behind the vehicle ahead. A convoy with a distance between vehicles of about 40 meters, at a speed of about 80 km/h, may reduce the air resistance to the second vehicle by about 20% and that to the third and further vehicles by about 30%.

However, a vehicle using active boundary layer control destroys the possibility of utilising its wake to reduce air resistance to following vehicles in a convoy. The active boundary layer control of the vehicle 1 in FIG. 2 is therefore arranged so that it can when necessary be switched off to enable following vehicles in the convoy to derive benefit from the wake.

Switching the active boundary layer control off may be effected in various ways. For example, the driver of the vehicle 1 may switch the compressor 4 off manually when there are vehicles in convoy behind the leading vehicle 1. The driver may with advantage be assisted in this by there being on the rear wall of the vehicle 1 a conventional distance sensor 6 which measures the distance from the vehicle behind. This enables the driver to switch the active boundary layer control off at times when the air resistance to vehicles behind the driver's vehicle 1 may be assumed to decrease more than the air resistance to the driver's vehicle 1 increases. The result is optimisation of the overall air resistance to the vehicles concerned. A distance from the vehicle behind which may be suitable for switching the active boundary layer control off is about 100 meters, but this distance may vary in different operating situations with different sizes of vehicles, different speeds etc.

Figure 3:
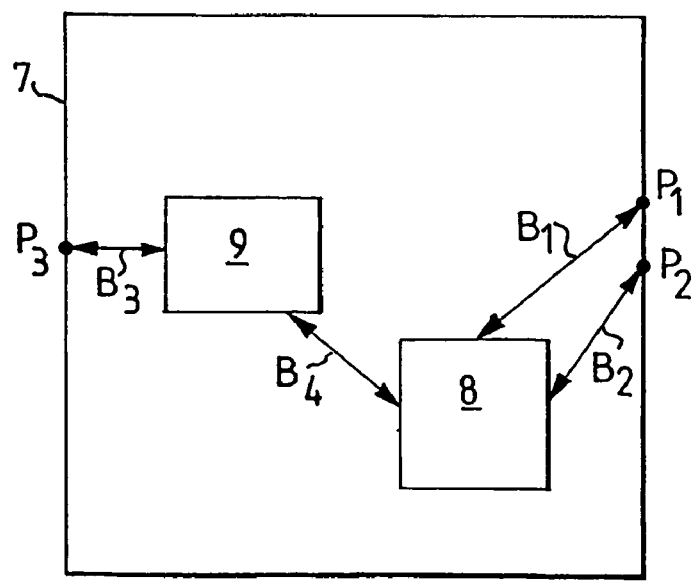
FIG. 3 depicts schematically a control device in cutaway section.

The vehicle 1 in FIG. 2 incorporates a control device 7 which is depicted in more detail in FIG. 3. The control device comprises a known type of computer 8, e.g. a microprocessor. The computer 8 receives via a port $P_1$ of the control device 7 signals corresponding to information from the distance sensor 6, and possibly via other undepicted ports signals corresponding to information from other sensors normally present in a vehicle, e.g. speedometer etc. The computer 8 then uses information about, for example, the vehicle's speed and the distance from the vehicle behind to calculate whether it is advantageous to switch the active boundary layer control off. If such is the case, signals corresponding to information about switching are sent via a port $P_2$ to the compressor 4, whereupon the compressor 4 shuts down. The computer 8 may of course also be arranged to inform the driver when it is advantageous to switch off the active boundary layer control off, whereupon the driver can effect switching off manually. The computer 8 works on the basis of what is indicated in the computer program which is stored on some form of support 9, e.g. a flash memory, ROM memory, EPROM or some other non-volatile memory, which support is read by the computer 8. The control device may comprise a port $P_3$ via which the support 9 can be loaded with the computer program. The computer program may thus be stored on a support in the form of a CD-ROM or the like and be downloaded to the support 9 via port $P_3$. Communication between the computer 8 and respectively the support 9 and ports $P_1$-$P_3$, and between the computer 8 and the support 9, takes place advantageously via databuses $B_1$-$B_4$, and communication between the control device and respectively the distance sensor 6 and the compressor 4, which communication in FIG. 2 is schematically represented by broken lines, takes place, for example, via CAN buses.

If the distance from the vehicle behind subsequently increases so much that, with the active boundary layer control switched off, the air resistance to the vehicle behind the driver's vehicle 1 no longer decreases more than the air resistance to the driver's vehicle 1 increases, the computer 8 sends signals corresponding to information about switching on the compressor 4. The active boundary layer control is thus switched on again automatically when this is advantageous. Switching on may of course also be effected manually by the driver on the basis of his/her own assessment of when it is time to do so, or on the basis of information from the computer 8 concerning when it is time to effect switching on.

The control signal to the means 4, 5 for regulating the magnitude of the wake 2 is described above as a signal corresponding to regulating in the form of switching the active boundary layer control on or off, but a signal corresponding to regulating in the form of decreasing or increasing the active boundary layer control is also conceivable. Such decrease and increase may with advantage be effected by altering the air flow through the compressor 4 and the gap 5.

Figure 4A:
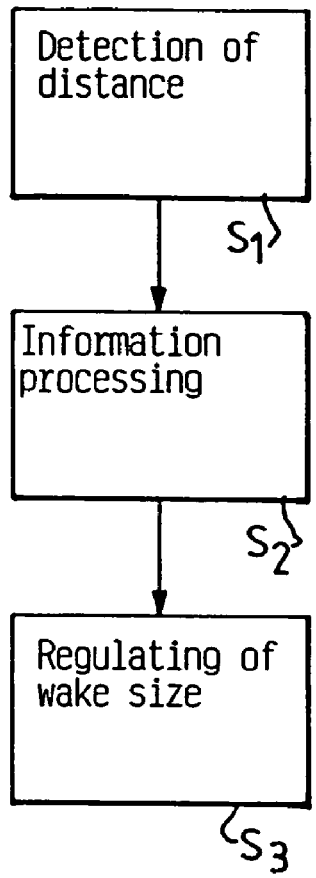
FIGS. 4a-c depict flowcharts of various embodiments of the method according to the invention.
Figure 4B:
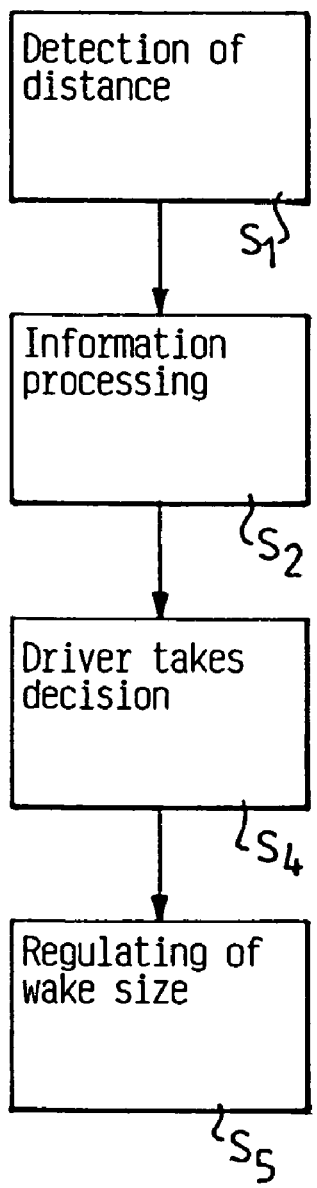
Figure 4C:
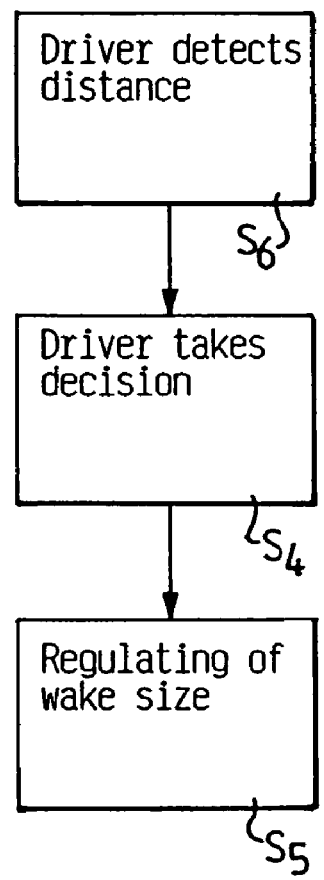

FIGS. 4a-4c depict schematically various embodiments of the method according to the invention in the form of flowcharts. In the method according to FIG. 4a, everything is taken care of automatically. The distance from the vehicle behind is detected (step $S_1$) and information concerning that distance is sent to the computer 8 which, on the basis of what is indicated in a computer program stored on the support 9, processes-this and any other information received ($S_2$), followed by the result of this information processing being sent in the form of a control signal to the means 4, 5 for regulating the magnitude of the wake 2 formed behind the leading vehicle 1 (step $S_3$).

In the method according to FIG. 4b, steps $S_1$ and $S_2$ are the same as in the method according to FIG. 4a, but the information is sent instead to the driver, who may decide whether the regulating of the magnitude of the wake should be altered (step $S_4$), followed by the magnitude of the wake being regulated in response to command from the driver (step $S_5$). The driver may with advantage receive information from step $S_2$ presented on a display on the dashboard or the like, and communication to and from the driver is advantageously via CAN buses.

The method according to FIG. 4c differs from the method according to FIG. 4b in that the driver also takes care of detecting the distance (step $S_6$). This detection is effected with advantage by visual judging, e.g. via rear view mirrors, of the distance from the vehicle behind.

The invention described above makes it possible to minimise air resistance in both single driving and convoy driving. Lower air resistance also means lower fuel consumption. It may be mentioned for example, that convoy driving with distances of between 20 and 80 meters between vehicles results in average fuel savings of almost 9%. The closer together the vehicles, the greater the fuel saving. It should be noted, however, that a distance of about 40 meters between vehicles has normally to be maintained as safety distance in convoy driving at about 80 km/h to enable drivers to react in good time when deceleration occurs.

It is with advantage also possible for the driver to be able to regulate the active boundary layer control manually even if the latter is arranged, as in FIG. 4a, to be regulated entirely automatically, e.g. for him/her to be able to opt to keep the active boundary layer control switched on at times when optimisation of the overall air resistance to the leading and the following vehicle would entail it being switched off, if for any reason the driver considers it more important to reduce the air resistance to the leading vehicle than to that/those behind.

The invention claimed is:

1. A method for regulating during driving the air resistance to a leading and at least one following vehicle, the method comprising:
   using a distance sensor to detect a distance between the leading vehicle and the at least one following vehicle, the leading vehicle not being connected to the at least one following vehicle; and
   regulating a magnitude of a wake formed behind the leading vehicle according to the detected distance between the leading and the following vehicles in order to optimize an overall air resistance to both the leading and the at least one following vehicle, the regulating of the magnitude of the wake being accomplished using an active boundary layer control positioned on the leading vehicle.

2. A method according to claim 1, wherein the regulating of the magnitude of the wake behind the leading vehicle comprises switching the active boundary layer control off when the distance between the leading and the at least one following vehicle decreases to below a predetermined value.

3. A device for regulating during driving the air resistance to a leading and at least one following vehicle, the device comprising;
   an active boundary layer control positioned on the leading vehicle, the active boundary layer control being operable for regulating a magnitude of a wake formed behind the leading vehicle;
   a distance sensor at the leading vehicle, the distance sensor being operable for measuring a distance between the leading and the at least one following vehicle, the leading vehicle not being connected to the at least one following vehicle; and
   a control device operable for controlling the active boundary layer control according to the distance detected by the sensor, in order to optimize an overall air resistance to the leading and the following vehicle.

4. A computer program comprising:
   a computer-readable code recorded on a computer-readable medium which, when run on a computer, causes a control device to regulate an air resistance to a leading vehicle and at least one following vehicle, the leading vehicle not being connected to the at least one following vehicle, the computer-readable code causing the control device to regulate the air resistance by detecting a distance between the leading vehicle and the at least one following vehicle and by using an active boundary layer control positioned on the leading vehicle to regulate a magnitude of a wake formed behind the leading vehicle according to the detected distance to optimize an overall air resistance to both the leading and the at least one following vehicle.

5. A computer program product comprising;
   a support; and
   a computer program including a computer-readable code which, when run on a computer, causes a control device to regulate an air resistance to a leading vehicle and at least one following vehicle, the leading vehicle not being connected to the at least one following vehicle, the computer-readable code causing the control device to regulate the air resistance by detecting a distance between the leading vehicle and the at least one following vehicle and by using an active boundary layer control positioned on the leading vehicle to regulate a magnitude of a wake formed behind the leading vehicle according to the detected distance to optimize an overall air resistance to both the leading and the at least one following vehicle, the computer program being recorded on the support.

6. A method according to claim 2, wherein the regulating further comprises switching on and using the active boundary layer control to reduce the magnitude of the wake as the distance between the leading and the at least one following vehicle increases above a respective predetermined value.

7. A method according to claim 6, wherein the regulating further comprises using the active boundary layer control to increase the magnitude of the wake as the distance between the leading and the at least one following vehicle decreases below the respective predetermined value.

8. A device according to claim 3, wherein the leading vehicle comprises a rear edge facing the at least one following vehicle and the active boundary layer control comprises an air flow device positioned on the leading vehicle and distanced from the rear edge of the leading vehicle in a direction away from the at least one following vehicle, the air flow device being operable to affect an air flow past the leading vehicle for regulating the wake.

9. A device according to claim 8, wherein the air flow device is operable to direct air inwardly from a surface of the leading vehicle past which air flows during driving.

* * * * *